United States Patent [19]

Decker et al.

[11] 4,258,566
[45] Mar. 31, 1981

[54] LOAD INDICATING APPARATUS HAVING A HYDRAULIC SENSING UNIT AND COUPLING PIN TYPE ELECTRONIC SENSING UNIT

[75] Inventors: Elmer L. Decker, Long Beach; James Moon, Santa Ana, both of Calif.

[73] Assignee: Decker Engineering Corporation, Long Beach, Calif.

[21] Appl. No.: 53,917

[22] Filed: Jul. 2, 1979

[51] Int. Cl.³ .............................................. G01L 1/26
[52] U.S. Cl. ..................................... 73/141 R; 73/143
[58] Field of Search ................... 73/141 R, 143, 141 A

[56] References Cited

U.S. PATENT DOCUMENTS

| | | | |
|---|---|---|---|
| 3,004,558 | 10/1961 | Crane | 73/143 |
| 3,695,096 | 10/1972 | Kutsay | 73/141 A |
| 3,999,427 | 12/1976 | Decker et al. | 73/141 R |
| 4,161,117 | 7/1979 | Decker et al. | 73/141 R |
| 4,162,629 | 7/1979 | Howard | 73/141 R |

*Primary Examiner*—Donald O. Woodiel
*Attorney, Agent, or Firm*—Paul A. Weilein

[57] ABSTRACT

Load indicating apparatus in which a hydraulic load sensing unit is pivotally connected by coupling pins respectively with opposed members capable of relative movements under applied load forces, one of the coupling pins comprising an electronic load sensing unit in the form of a hollow pivot pin structure with internally mounted electrically interconnected strain gages operative in response to the applied load forces to generate an output signal. The pivot pin structure of the electronic load sensing unit is circumferentially oriented to a predetermined fixed operative position by a tool having the same coupled pivotal length as the hydraulic load sensing unit, and which is connectable between the opposed members in place of the hydraulic unit, said tool having a shoulder for initially engaging and locating an anchor bar on an adjacent surface of the associated opposed member in a position to circumferentially retain the hollow pin structure in a correct operating position, whereupon the anchor bar is permanently secured as by welding, the tool removed and the hydraulic sensing unit connected.

17 Claims, 6 Drawing Figures

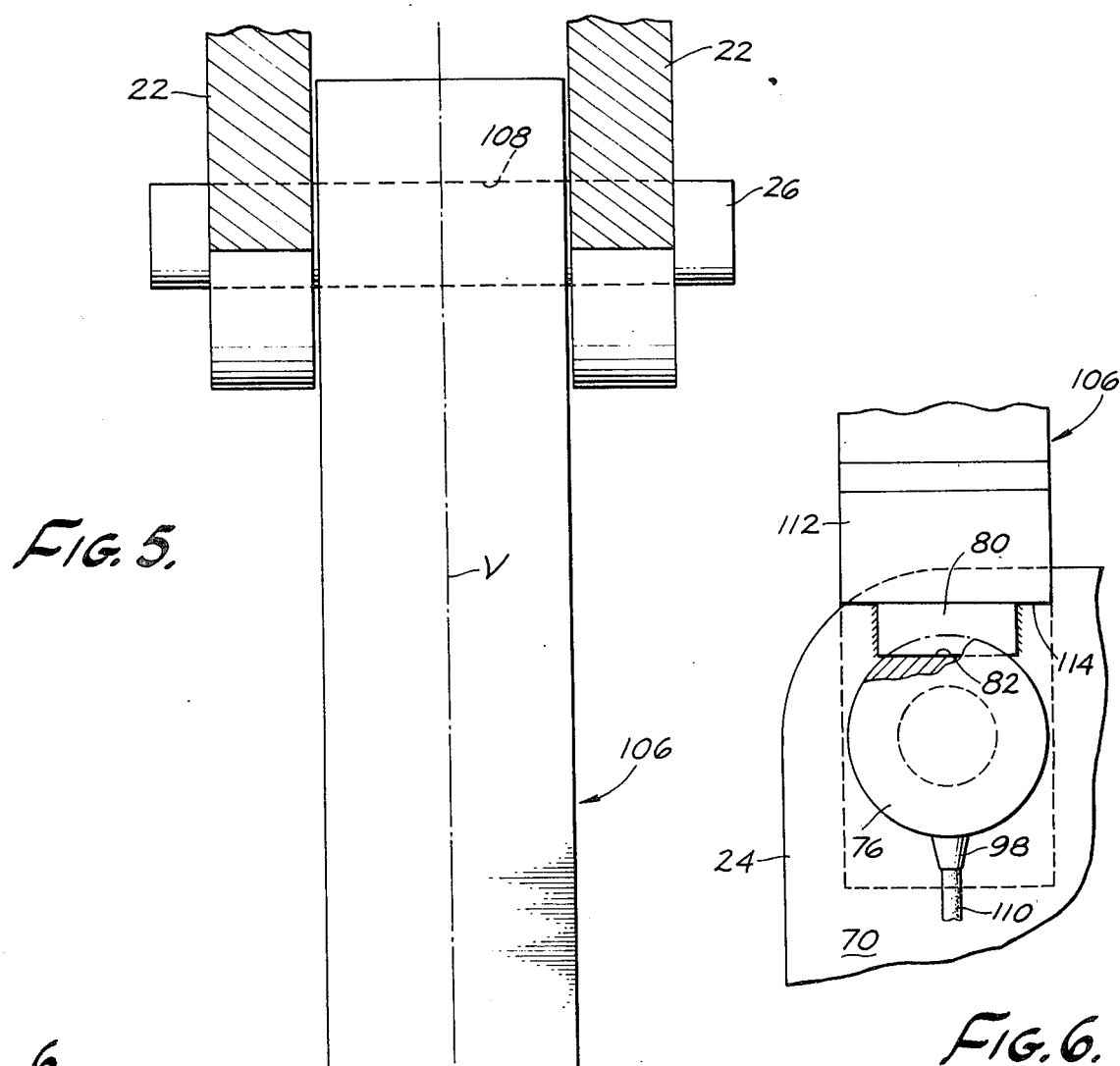
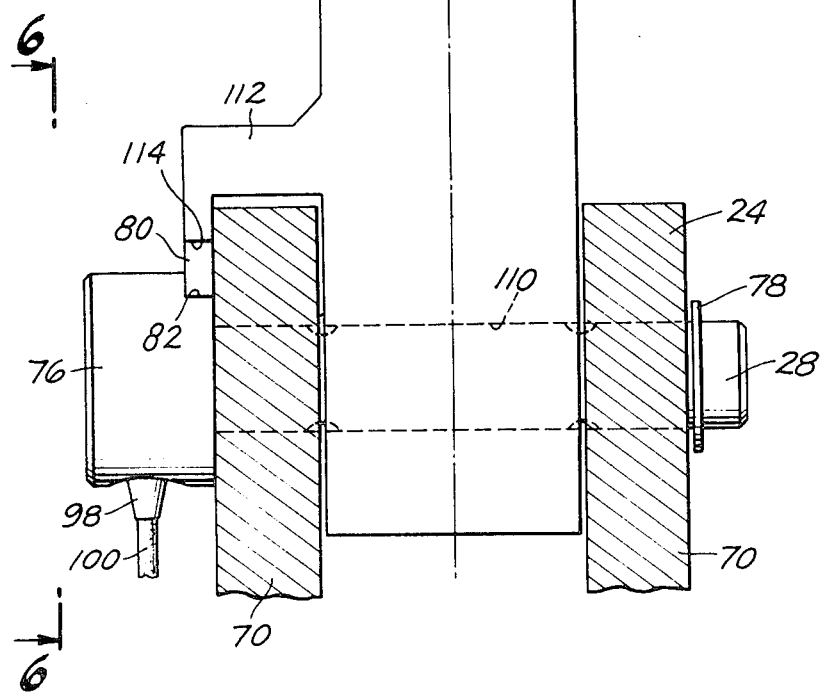
Fig. 5.
Fig. 6.

LOAD INDICATING APPARATUS HAVING A HYDRAULIC SENSING UNIT AND COUPLING PIN TYPE ELECTRONIC SENSING UNIT

BACKGROUND OF THE INVENTION

The present invention relates generally to load sensing such as utilized in connection with apparatus for indicating the loads sustained by lines, cables and the like in cranes, derricks and similar equipment.

Heretofore, as disclosed in U.S. Pat. No. 3,999,427, issued Dec. 28, 1976, it has been generally known to utilize a load sensing unit for load indicating apparatus, in which a hydraulic load cell and an electronic load cell are mechanically interconnected in stacked relation into a single load sensing unit appropriately connectable between opposed members of the apparatus capable of relative movements towards each other under the applied load forces which subject the load cells to the action of compression forces.

More recently, such combined hydraulic-electronic units have also been publicly known wherein the units are arranged to be connected between opposed members of the load indicating apparatus, that are movable away from each other under applied load tension forces.

For a number of years, many field installations have utilized load indicating apparatus of the type disclosed in U.S. Pat. No. 3,004,558, issued Oct. 17, 1961, in which the sensing device is of the hydraulic type and is in the form of a single unit that is pivotally connectable respectively at its upper and lower ends between a pair of opposed force applying members that are operable to subject the sensing device to tension forces.

Since the advent of the combined hydraulic-electronic sensing device concept, such as disclosed in the previously mentioned U.S. Pat. No. 3,999,427, the need has been realized for an improved combined hydraulic-electronic load sensing arrangement which would permit the utilization of a hydraulic sensing unit of the type disclosed in the above mentioned U.S. Pat. No. 3,004,558, and to which, in either a new indicating apparatus or an existing indicating apparatus in a field installation, an electronic sensing unit could be added in such a way as to be responsive to the same load forces as those applied to the associated hydraulic unit.

In the present invention this need has been fulfilled by the utilization of a strain detecting load cell embodiment of the type disclosed in U.S. Pat. No. 3,695,096, issued Oct. 3, 1972, in which the electronic unit takes the form of a coupling pivot pin structure, and which may be utilized to replace either the upper or lower pivotal connection for connecting the hydraulic unit with the load responsive members of the indicating apparatus. In the present disclosure, it is shown as replacing the pivot pin of the lower pivotal connection.

Since the load indicating signal of the coupling pivot pin type of load cell varies with the radial angle of application of the load forces, it is necessary to fixedly circumferentially orient the device with respect to a predetermined load application axis. For this purpose, there is provided a unique tool in the form of an elongated link member having the same length between its pivotally connected opposite ends as the hydraulic load sensing unit, and which is temporarily installed between the force applying members of the load indicating apparatus. The electronic coupling pin unit is utilized for one of the pivotal connections of the tool, and the associated tool end is provided with a shoulder portion for initial engagement with an anchor bar in a manner to initially position the bar in interfaced relation with a surface of the electronic sensing unit and to thereby position the unit in its proper operating position against rotation. The oriented position of the unit thus being determined, the anchor bar is then permanently welded or otherwise fixed to an adjacent portion of the associated force applying member. The tool is then removed and the hydraulic sensing unit installed, utilizing the thus oriented electronic unit as one of the pivot members.

SUMMARY OF THE INVENTION

The present invention is more specifically concerned with the provision of a unique arrangement for operatively combining a hydraulic sensing unit and an electronic sensing unit in a load indicating apparatus, and which permits the utilization of a conventionally known hydraulic sensing unit to be pivotally coupled between opposed members of the load indicating apparatus, which are capable of relative movements under applied load forces, and wherein one of the coupling connections comprises an electronic load sensing unit in the form of a coupling pin or pivot.

With the foregoing in mind, it is one object of the present invention to provide a unique means and method for the combining of a hydraulic load sensing unit and an electronic load sensing unit in a load indicating apparatus.

A further object is to provide a load indicating apparatus according to the foregoing object, in which the electronic load sensing unit is utilized as a component of the mounting means for the hydraulic load sensing unit.

A further object is to provide a load indicating apparatus which embodies a hydraulic load sensing unit pivotally connected by coupling pins respectively between a pair of opposed members capable of relative movements under load forces, and in which one of the coupling pins comprises an electronic load sensing unit.

Another object is to provide a load indicating apparatus according to the previous object, in which a unique tool is utilized for locating an anchor member for circumferentially retaining the electronic coupling pin sensing unit in a predetermined operative position.

Still another object is to provide an improved method for the fabrication of load sensing means in load indicating apparatus, in which a hydraulic sensing unit has a pivoted mounting connection comprising an electronic sensing unit.

It is also an object to provide as an article of manufacture, a unique tool for use in the installation of an electronic load sensing unit for operation in association with a hydraulic sensing unit in a load indicating apparatus.

Further objects and advantages of the invention will be brought out in the following part of the specification, wherein detailed description is for the purpose of fully disclosing a preferred embodiment of the invention without placing limitations thereon.

BRIEF DESCRIPTION OF THE DRAWINGS

Referring to the accompanying drawings, which are for illustrative purposes only:

FIG. 5 is an enlarged elevational view illustrating a tool and its manner of connection between the force movable members of a load indicating apparatus, for orienting anchor means for retaining the electronic sensing unit in a predetermined fixed oriented operating position; and FIG. 6 is a fragmentary side elevational view of the lower end of the tool and the electronic sensing unit, as seen along line 6—6 of FIG. 5.

DESCRIPTION OF A PREFERRED EMBODIMENT

Figure 1:
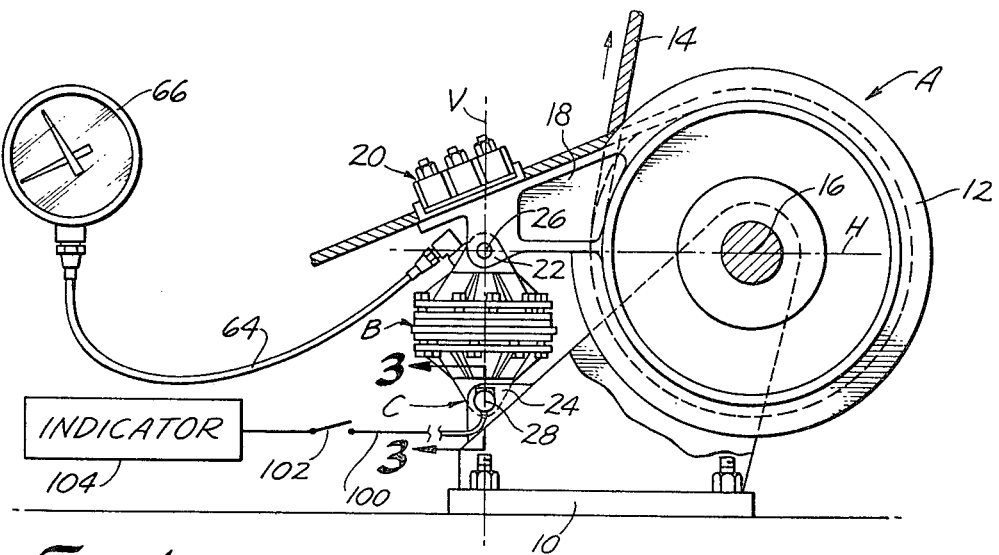
FIG. 1 is a side elevational view of a combined cable anchor and weight indicator which includes a hydraulic sensing unit and an electronic sensing unit according to the present invention.

Referring more specifically to the drawings, there is shown in FIG. 1 a combined cable anchor and load indicating apparatus A, such as employed in connection with well drilling equipment to indicate the load forces on the cable. The apparatus is operatively connected with load sensing means which includes a hydraulic load sensing unit B and an electronic load sensing unit C, these sensing units being operatively mechanically interconnected and being independently responsive to the cable load forces, in a manner which will hereinafter be explained more fully.

The load indicating apparatus A includes a base 10 on which is mounted a rotary snubbing drum 12 around which is wound several turns of a cable 14 which may be the deadline of a hoist system of a well drilling rig. The rotary snubbing drum 12 is supported upon an upwardly extending portion of the base 10 for rotational movement about an axis of rotation 16 and carries a fixed arm extension 18 which is movable with the drum in response to the application of load forces on the cable 14. The arm extension 18 is shown as being provided with an appropriate cable clamping means 20 for dead-ending the cable. The arm 18 and base 10 are respectively provided with projecting portions 22 and 24 which are in vertically spaced relation and form opposed movable and fixed members which are movable away from each other under the applied load forces on the cable 14. The hydraulic load sensing unit B is connected at its top end to the member 22 by a pivot member 26, and at its bottom end to the fixed member 24 by a pivot structure 28 which in this case comprises the electronic load sensing unit C.

Figure 2:
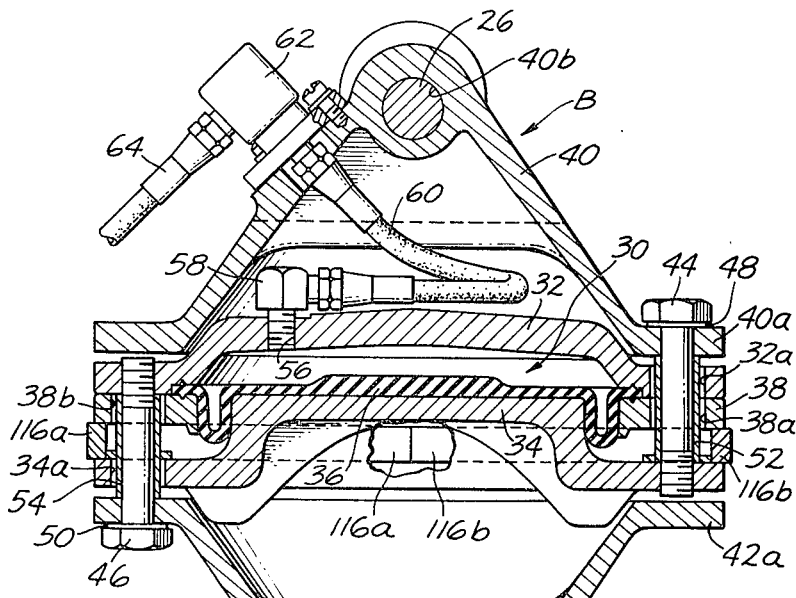
FIG. 2 is an enlarged vertical sectional view of the hydraulic sensing unit of FIG. 1.

The details of construction of the hydraulic load sensing unit B are best shown in FIG. 2 and in general embodies a structure similar to that disclosed in the previously mentioned U.S. Pat. No. 3,004,558 which is included herein by reference. Specifically, the hydraulic unit includes a hydraulic pressure chamber 30 formed between a pair of opposed plate-like and preferably circular members 32 and 34, with the aid of a flexible diaphragm 36 which is peripherally clamped to the peripheral portion of the member 32 by a clamping ring 38. The member 34 contacts the major portion of the outer surface of the diaphragm so that when a force is applied to move the members 32 and 34 toward each other a hydraulic pressure will be developed in the chamber 30.

In order to convert the tension forces, which operate to move the members 22 and 24 away from each other, into compression forces for moving the plate members 32 and 34 in a direction towards each other and thus provide the required hydraulic pressure in the chamber 30, a pair of force-applying elements 40 and 42 are positioned on the opposite sides of the diaphragm unit. These force-applying elements also form a protective housing for the diaphragm unit and are of generally conical configuration and formed with marginal flanges 40a and 42a respectively. At their apices, the elements 40 and 42 are provided with eyes 40b and 42b, respectively, for the reception of the pivot member 26 and the pivot structure 28.

The element 40 is rigidly connected with the member 34 by means of tie bolts 44, and the element 42 is connected with the member 32 by means of tie bolts 46, these bolts being arranged alternately in a circular series and equidistantly spaced from one another. The bolts 44 pass through the flange 40a so that the bolt heads will rest on underlying washers 48 on the flange 40a, and the bolts 46 pass through the flange 42a so that the heads of these bolts rest on underlying washers 50 on the flange 42a. The other ends of the bolts 44 and 46 are threadedly engaged with the peripheral portions respectively of the member 34 and the member 32.

Registering openings 32a and 38a in the periphery of the member 32 and in the ring 38, respectively, accommodate the bolts 44 so that the member 34 will be moved toward the member 32 when a tension force is applied to the element 40. Similar registering openings 34a and 38b in the peripheral margin of member 34 and the clamping ring 38, respectively, accommodate the bolts 46 so that relative movement of the members 32 and 34 may take place for creating hydraulic pressure in the chamber 30 when tension forces are applied tending to move the force applying elements 40 and 42 away from one another.

Spacer sleeves 52 and 54 surround the bolts 44 and 46, respectively. The ends of the sleeves 52 abut the flange 40a and the peripheral margin of the member 34, respectively. The ends of the sleeves 54 abut the flange 42a and the peripheral margin of member 32. These sleeves insure accurate positioning of the diaphragm unit and have ample clearance in the openings through which the bolts extend.

The member 32 is provided with a port 56 through which the chamber 30 may be filled and to which is connected by means of a fitting 58, one end of a flexible conduit 60 contained within the member 40. The other end of the conduit is connected with a fitting 62 on one side of the member 40 and which provides for connection with a line, such as the conduit 64, to apply hydraulic pressure to a gage or indicator 66, as shown in FIG. 1.

Figure 3:
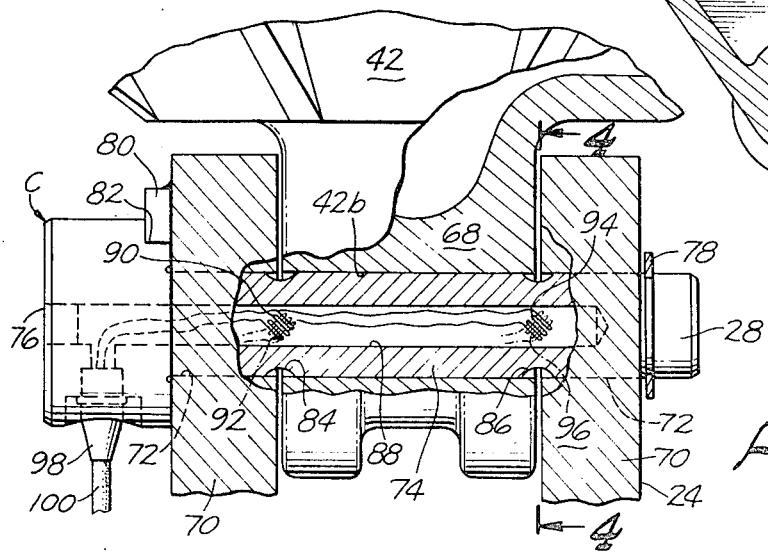
FIG. 3 is an enlarged fragmentary sectional view, taken substantially on line 3—3 of FIG. 1, and having cut away portions showing structural details of the associated coupling pin type electronic sensing unit.

The details of construction of the electronic load sensing unit C are best shown in FIG. 3, and in general embodies a structure of the type disclosed in the previously mentioned U.S. Pat. No. 3,695,096 which is included herein by reference. Specifically, the electronic unit embodies the pivot structure 28 which is utilized to connect the bottom end of the hydraulic unit B with the fixed member 24 of the load indicating apparatus A. Appropriately, the force applying element 42 is formed with an end yoke 68 which defines the eye 42b, this yoke being disposed between the spaced legs 70 of a clevis formed by the fixed member 24. The legs 70 are formed with axially aligned bore openings 72 which together with the eye 42b are adapted to receive the pivot structure 28 therethrough and form a pivotal connection between the yoke 68 and member 24.

The electronic sensing unit is thus incorporated in the pivot structure 28 and comprises a generally cylindrical body 74 in which a middle peripheral surface area is arranged to engage the surface of the eye 42b, and flanking surface areas are arranged to similarly engage the surface areas of the bores 72 of the clevis legs 70. This arrangement provides axially spaced outer bearing elements and an intermediate bearing element of the interconnection.

The pivot structure 28 is formed with a head 76 and is retained in its operative position by suitable means such as a retaining snap ring 78. Turning of the structure 28 is prevented by means of an anchor bar 80 which is appropriately secured as by welding or other means to the adjacent leg 70 of the clevis structure, this bar having engagement with an interface flat surface 82 formed on the periphery of the head 76.

The previously mentioned middle surface portion and flanking surface portions of the pivot structure 28 are longitudinally separated by narrow zones 84 and 86 of slightly reduced diameter, these zones spanning the regions of the respective facing junctions between the yoke 68 and the clevis legs 70. As thus arranged, it will be evident that when the hydraulic unit B is subjected to tension forces, this force will be transmitted from the yoke to the clevis by the pivot structure 28, and thus subject the latter to shear and bending stresses, the reduced diameters of the zones 84 and 86 causing the shearing and bending stresses and consequent strains to be concentrated therein.

The pivot structure 28 is provided with an axial bore 88 wherein two strain gages 90 and 92 are bonded to the circumferential surface of the bore 88 in the concentration zone 84. These gages are situated opposite each other in a diametrical alignment at right angles to the known direction of the force exerted between the yoke and connected clevis. The gages 90 and 92 are also arranged with their sensing direction at 45° relative to the axis of the cylindrical body 74, but at 90° or crisscross relation to each other. A second pair of gages 94 and 96 is similarly disposed in the zone 86. Exterior connections from the gages are provided through a suitable seal fitting 98 and multiconductor cable 100 which is shown in FIG. 1 as being connected through an appropriate switch 102 with an indicator 104.

The operation of the strain gages, their interconnection and their use to indicate the load forces is conventional and well known in the industry.

An important feature of the present invention resides in the means and method by which the pivot structure 28 of the electronic unit C is circumferentially oriented so as to cooperatively function in the environment of the load indicating apparatus having the hydraulic unit B connected between the members 22 and 24. Referring again to FIG. 1, an important consideration of the indicating apparatus is that the horizontal axis of the pivot pin 26 and the axis of rotation 16 of the rotary snubbing drum 12 are positioned on a horizontal locus line H, while the horizontal axes of the pivot member 26 and the pivot structure 28 lie on a vertical locus line V in right angular relationship to the horizontal locus line H.

Figure 4:
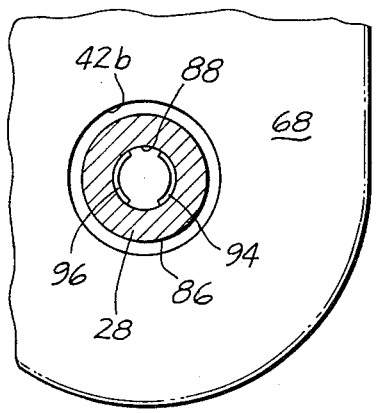
FIG. 4 is a transverse fragmentary sectional view, taken substantially on line 4—4 of FIG. 3.

As shown in FIGS. 4 and 5, a unique orienting tool, as generally indicated by the numeral 106, is utilized for properly orienting the anchor bar 80 prior to its being permanently secured to the adjacent leg of the clevis. As best shown in FIG. 4, this tool comprises an elongate link of generally rectangular cross section, and which is provided at its opposite ends with transverse extending bores 108 and 110, the longitudinal axes of which have the same spaced apart relationship as the longitudinal axes of the eyes 40b and 42b of the hydraulic load sensing unit B. These bores are adapted to respectively receive the pivot member 26 and the pivot structure 28, when connected between the members 22 and 24 of the load indicating apparatus A. As thus connected, the tool properly maintains the right angled relationship of the vertical locus line V and the horizontal locus line H, as previously described.

The lowermost end of the tool is formed with a laterally extending projection 112 which is arranged to overlie the end of the clevis leg 70 adjacent the head 76 of the electronic sensing unit. The outer end of the projection 112 has a right angled flange formed with a straight edge surface 114 which is adapted to abuttingly engage the adjacent edge of the anchor bar 80 and initially orient it in a proper position circumferentially of the head 76, when the bar is also in engagement along its opposite edge with the flat surface 82 formed on the head 76. With the anchor bar 80 initially positioned in the manner just described, the ends of the bar are temporarily tacked by welding to the adjacent leg 70 of the clevis. The tool may then be removed and the anchor bar more securely welded or otherwise fastened in its oriented position so as to thereby locate the electronic sensing unit C in its correct operative position when the hydraulic sensing unit B is connected between the members 22 and 24 of the load indicating apparatus A.

It will be apparent that the orienting tool 106, as described above, is also very useful in that it permits the conversion in the field of a previously installed load indicating apparatus A that is fitted with a hydraulic sensing unit B into a combined unit which includes the electronic sensing unit C as described herein.

In the operation of the load indicating apparatus A in which the hydraulic load sensing unit B and electronic load sensing unit C are arranged as hereinbefore described, it will be apparent that both of these sensing units will be activated and tend to show on their respective indicators the amount of the applied load force. When it is desired to use only the hydraulic load sensing unit B, the indicator 104 may be inactivated by opening the switch 102.

In the event that it is desired, for some particular operating condition or for some other reason, to utilize the output indications of the electronic load sensing unit C, rather than that of the hydraulic load sensing unit B, the switch 102 would be placed in its closed position and the compression forces acting on the plate members 32 and 34 will be by-passed by means which will now be described.

Referring to FIG. 2, it will be seen that the clamping ring 38, which is attached to and movable with the plate member 32, and the peripheral margin of the plate 34 are in normally spaced apart relation, and that during operation of the hydraulic load sensing unit this space tends to diminish as the applied load forces are increased.

Provision is therefore made for fixedly interconnecting the plate members 32 and 34 in a manner to prevent diminution of this space. This may be accomplished by providing a split ring structure, as generally indicated in FIG. 2. For convenience, this ring may comprise two diametrically abutting sections 116a and 116b to permit it to be easily inserted between the clamping ring 38 and the peripheral margin of the plate member 34.

From the foregoing description and drawings, it will be clearly evident that the delineated objects and features of the invention will be accomplished.

Various modifications may suggest themselves to those skilled in the art without departing from the spirit of the disclosed invention and, hence, it is not wished to be restricted to the specific forms shown or uses mentioned, except to the extent indicated in the appended claims.

What is claimed is:

1. Load sensing means for load indicating apparatus having a pair of spaced apart opposed members supported for relative movements under applied load forces, comprising:
    (a) a pair of load sensing units, one of the hydraulic type and one of the electronic type, mechanically interconnected in series operative relationship between said opposed members;
    (b) said hydraulic load sensing unit including a casing structure having upper and lower pivotal connections respectively with said opposed members; and
    (c) one of said pivotal connections including an electronic lead sensing unit.

2. Load sensing means according to claim 1, wherein each of said load sensing units is connected with an indicator; and
    selective means are provided for respectively rendering each of said load sensing units operative and inoperative with respect to its indicator.

3. Load sensing means according to claim 2, in which:
    said casing structure includes a pair of axially relatively movable members interconnected and operable to provide a variable hydraulic pressure chamber; and
    means are selectively operable to oppose relative axial movements of said members under increasing load forces.

4. Load sensing means according to claim 3, in which:
    said members are movable towards each other under tension forces applied to said pivotal connections; and
    said means to oppose said relative movements comprises a motion blocking member removably positionable between said members.

5. Load sensing means according to claim 2, in which:
    the indicator for the electronic load sensing unit is connected through a signal transmitting circuit; and
    switch means in said circuit are operable to isolate said indicator with respect to said electronic load sensing unit.

6. Load sensing means according to claim 1, in which:
    said one of said pivotal connections comprises a hollow pivot pin structure internally mounting electrical strain gage means responsive to the applied load forces.

7. Load sensing means according to claim 6, in which:
    one of said opposed members is fixed;
    said one of said pivotal connections is with said fixed opposed member; and
    means fixedly circumferentially orients said pivot pin structure with respect to said fixed opposed member.

8. Load sensing means according to claim 6, in which:
    said one of said pivotal connections includes a pair of axially spaced outer bearing elements and an intermediate bearing element operatively mounting said hollow pivot pin therein; and
    means fixedly circumferentially orients said pivot pin structure with respect to one of said bearing elements.

9. Load sensing means according to claim 7, in which:
    the orienting means comprises a peripheral flat surface on said pivot pin structure and an anchor bar fixedly mounted on said fixed opposed member in engagement with said flat surface.

10. Load sensing means according to claim 8, in which:
    said pivot pin structure is oriented with respect to one of said outer bearing elements.

11. The method of fabricating a load sensing means for a load indicating apparatus having one member supported for movement under an applied load force with respect to a fixed member, a casing structure of a hydraulic load sensing unit is connectable at one end by a pivot pin to said one member and at an opposite end to the fixed member by an electronic load sensing unit of the coupling pin type, which comprises the steps of:
    initially relatively positioning the movable member and fixed member of the load sensing means so that their pivot pin and coupling pin receiving axes are spaced apart along a common vertical locus line a distance corresponding to that for the connection of the hydraulic sensing unit;
    circumferentially orienting and releasably anchoring the coupling pin with respect to said vertical axis; and
    thereafter utilizing the pivot pin and oriented coupling pin to connect the hydraulic sensing unit between the movable and fixed members.

12. The method of fabricating a load sensing means for a load indicating apparatus having one member supported for movement under an applied load force with respect to a fixed member, a casing structure of a hydraulic load sensing unit is connectable at one end by a pivot pin to said one member and at an opposite end to the fixed member by an electronic load sensing unit of the coupling pin type, which comprises the steps of:
    initially relatively positioning the movable member and fixed member by means of an interconnecting link member so that their pivot pin and coupling pin receiving axes are spaced apart a distance corresponding to that for the connection of the hydraulic sensing unit;
    utilizing said link member as a reference for circumferentially orienting and releasably anchoring the coupling pin with respect to said link member; and
    thereafter utilizing the pivot pin and oriented coupling pin to connect the hydraulic sensing unit between the movable and fixed members.

13. The method of fabricating a load sensing means for a load indicating apparatus having one member supported for movement under an applied load force with respect to a fixed member, a casing structure of a hydraulic load sensing unit is connectable at one end by a pivot pin to said one member and at an opposite end to the fixed member by an electronic load sensing unit of the coupling pin type, which comprises the steps of:
    initially circumferentially orienting the coupling pin with respect to the directional axis of the load forces applied to said hydraulic load sensing unit; and
    thereafter fixedly anchoring said oriented coupling pin with respect to said fixed member of the load indicating apparatus.

14. The method of fabricating a load sensing means for a load indicating apparatus having a pair of opposed members supported for relative movements under an applied load force, and a casing structure of a hydraulic load sensing unit connectable between said opposed members by a pivot pin at one end and an electronic sensing unit of the coupling pin type at its other end, which comprises the steps of:

initially circumferentially orienting the coupling pin with respect to the directional axis of the application of the load forces to the hydraulic load sensing unit; and thereafter anchoring said oriented coupling pin with reference to its associated opposed member.

15. As an article of manufacture, a tool for initially positioning an anchor member for circumferentially orienting an electronic load sensing unit of the coupling pin type for pivotally connecting one end of a hydraulic load sensing unit to one of a pair of relatively movable load responsive members of a load indicating apparatus, said tool comprising:

an elongated link member having transversely extending parallel end bores enabling the link to be pivotally connected between said pair of relatively movable members;

a lateral projection at the end of said link that connects with said one of said pair of load responsive members, said projection being formed with a straight edge adapted to initially engage and locate the anchor member for permanent securement in a position to circumferentially orient the associated electronic load sensing unit.

16. As an article of manufacture, a tool for initially positioning an anchor member for circumferentially orienting an electronic load sensing unit of the coupling pin type for pivotally connecting one end of a hydraulic load sensing unit to one of a pair of relatively movable load responsive members of a load indicating apparatus, said tool comprising:

an elongated link member having transversely extending parallel end bores; and a lateral projection adjacent one end of said link, said projection being inwardly spaced from the adjacent end of the associated bore, and having a straight edge portion in spaced tangential relation to said bore end.

17. An article of manufacture according to claim 16, in which the lateral projection has a right-angled outer end portion spaced outwardly beyond the adjacent end of the bore, and which is configured to provide said straight edge portion.

\* \* \* \* \*